United States Patent [19]
Tsuruya

[11] Patent Number: 5,526,560
[45] Date of Patent: Jun. 18, 1996

[54] METHOD FOR MANUFACTURING A STATOR OF A STEPPING MOTOR

[75] Inventor: Yoku Tsuruya, Atsugi, Japan

[73] Assignees: Canon Seiki Kabushiki Kaisha; Canon Kabushiki Kaisha, both of Tokyo, Japan

[21] Appl. No.: 203,579

[22] Filed: Mar. 1, 1994

[30] Foreign Application Priority Data

Mar. 5, 1993 [JP] Japan .................................. 5-071052
Mar. 5, 1993 [JP] Japan .................................. 5-071053

[51] Int. Cl.⁶ ........................................................ H02K 15/02
[52] U.S. Cl. .............................. 29/596; 72/332; 72/348; 310/42; 310/263
[58] Field of Search ........................ 29/596, 598; 72/332, 72/348; 310/42, 49 R, 162, 163, 257, 263

[56] References Cited

U.S. PATENT DOCUMENTS 4,418,471  12/1983  Torii et al. .................... 29/596

FOREIGN PATENT DOCUMENTS 2507949   12/1982  France .
57-211964 12/1982  Japan .
58-29350   2/1983  Japan .

*Primary Examiner*—Carl E. Hall
*Attorney, Agent, or Firm*—Fitzpatrick, Cella, Harper & Scinto

[57] ABSTRACT

A method for manufacturing a stator of a stepping motor comprises the steps of carrying out a half-pierce and push-back process to a frame plate to make an area in which comb teeth are to be formed and an area to be blanked out readily separable, carrying out a blanking process to separate the blanked out area from the comb teeth, and bending the comb teeth to a predetermined angle and collapsing the comb teeth to make the thicknesses of the comb teeth uniform. The comb teeth are then bent at right angles to an outer periphery of the frame plate.

7 Claims, 12 Drawing Sheets

METHOD FOR MANUFACTURING A STATOR OF A STEPPING MOTOR

BACKGROUND OF THE INVENTION

1. Field of the Invention

The present invention relates to a method for manufacturing a stator of a rotor, and more particularly to a method for manufacturing comb teeth of a stator of a small size stepping motor having an outer cylinder diameter of 10 to 100 mm.

2. Related Background Art

Figure 1:
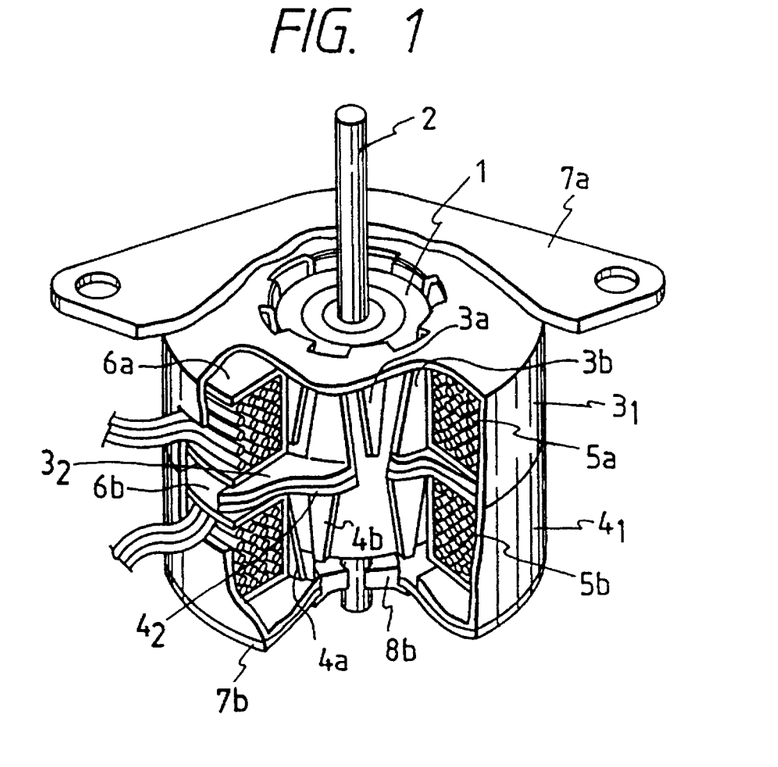
FIG. 1 shows a fragmentary view of a stepping motor.
Figure 2:
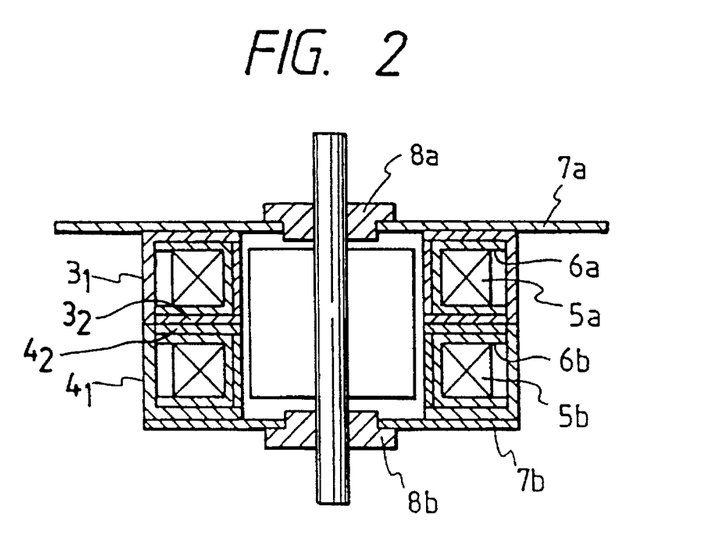
FIG. 2 shows a sectional view of the motor shown in FIG. 1.

As shown in FIGS. 1 and 2, a stepping motor generally comprises a rotor 1 and stators $3_1$, $3_2$ and $4_1$, $4_2$, and the stators $3_1$, $3_2$ and $4_1$, $4_2$ have a plurality of pole teeth (comb teeth) 3a, 3b, 4a and 4b for mounting exciting coils 5a and 5b circumferentially formed thereon at a constant pitch. The comb teeth 3a, 3b, 4a and 4b are preferably longer in order to attain a large effective magnetic flux created by the excitation the excitation coils 5a and 5b. However, where the comb teeth are manufactured by simply blanking a center of a single frame plate as is done in the prior art, the length of the comb teeth is less than one half of a blanking diameter and there is a limit in attaining a large effective magnetic flux. A method for manufacturing a stator to solve the above problem has been proposed in Japanese Patent Publication No. 57-211964 (Patent Application No. 56-98007).

Figure 11A:
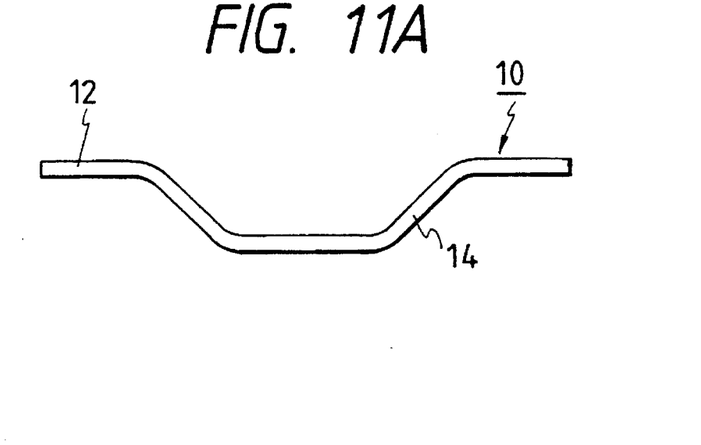
FIGS. 11A to 11C show prior art manufacturing processes of a stator of a stepping motor.
Figure 11B:
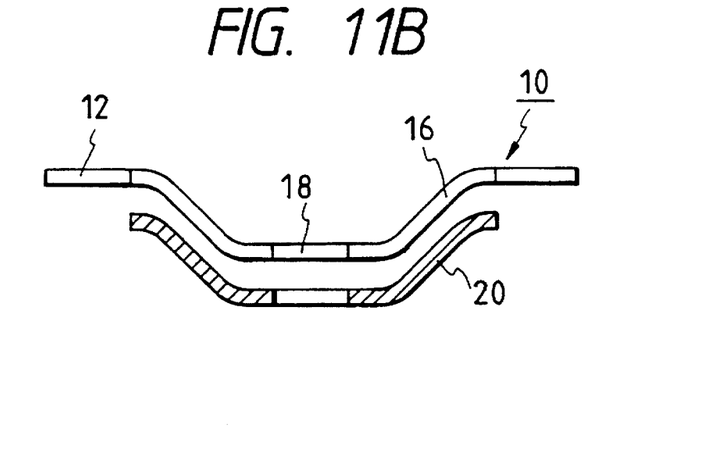
Figure 11C:
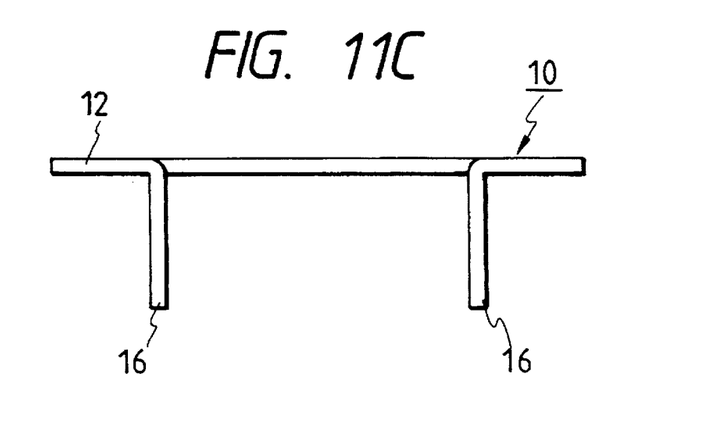

In the proposed method for manufacturing the stator, as shown in a sectional view of FIG. 11A, a center area 14 of a single frame plate 10 is convex-formed, then as shown in a sectional view of FIG. 11B, the center area 14 is blanked while leaving a comb teeth area 16, and finally as shown in sectional view of FIG. 11C, the comb teeth area 16 is bent normally to the frame plate by burring to manufacture the stator. In accordance with the proposed manufacturing method, the length of the comb teeth may be made larger than one half of the blanking diameter. Numeral 12 denotes an outer periphery of the frame plate, numeral 18 denotes a center hole formed by the blanking, and numeral 20 denotes a blanked piece.

Figure 12:
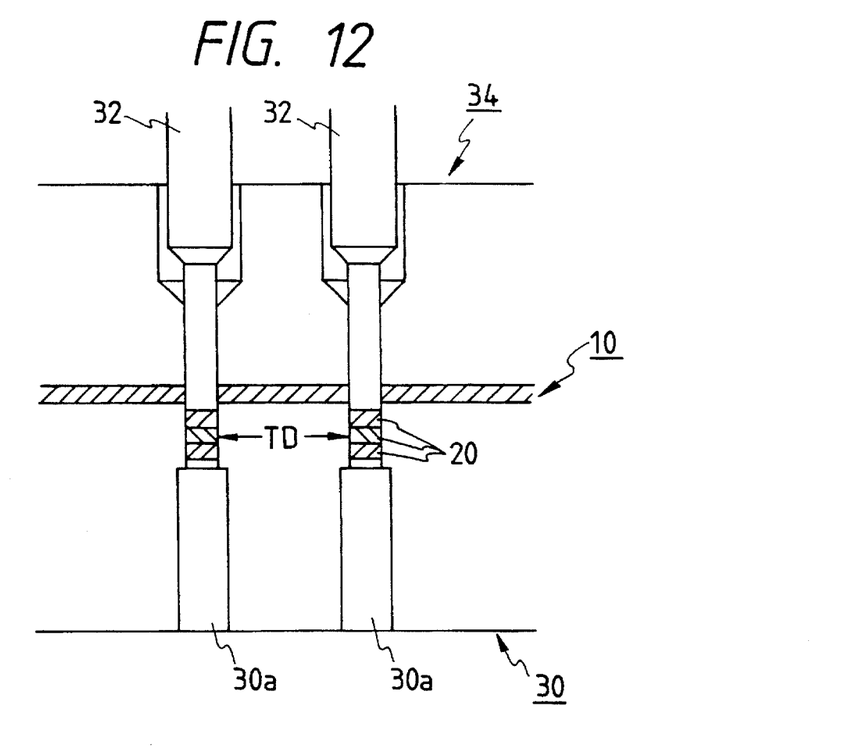
FIG. 12 shows a sectional view of a member used in a prior art blanking process shown in FIGS. 11A to 11C and an operation thereof.
Figure 13:
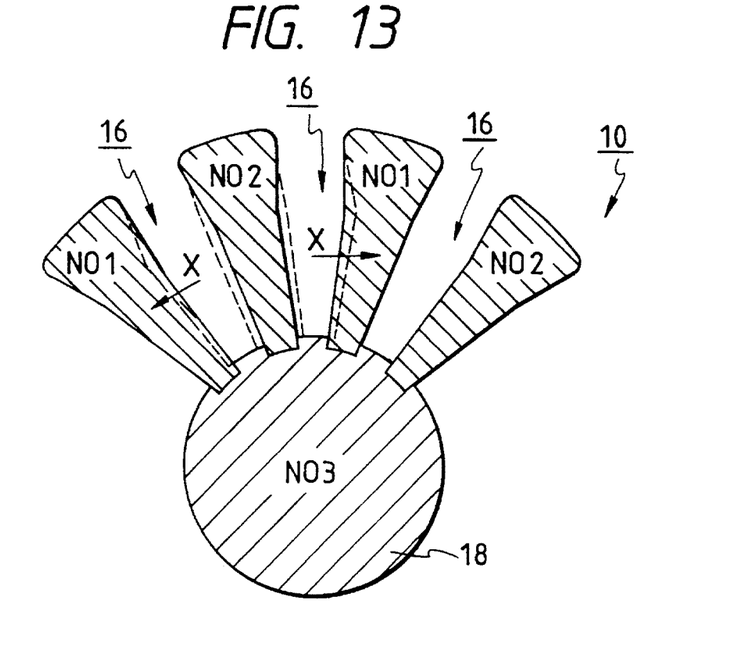
FIG. 13 shows plan view for illustrating a sequence of blanking in the prior art multi-step process shown in FIGS. 11A to 11C, FIGS. 14A to 14C show plan views for illustrating a sequence of blanking in the prior art multi-step process shown in FIGS. 11A to 11C.
Figure 14A:
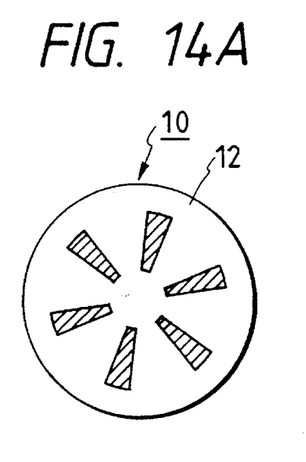
Figure 14B:
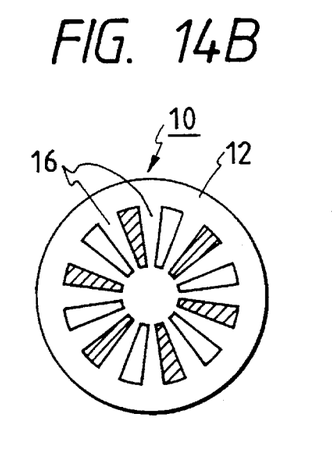
Figure 14C:
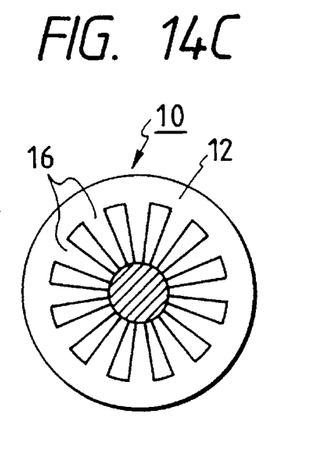

However, the prior art manufacturing method has the following problems:

(1) The stator is usually manufactured by sequentially feeding the frame plate by transfer press. As shown in FIG. 12, in the blanking process, the frame plate 10 is supported by a die 30 from the bottom and it is blanked by a punch 32. Because of the strength of the die, it is not possible to blank the comb teeth of the stator in one step and it is usually done in two or three steps. Numeral 34 denotes a stripper and $T_D$ denotes an interval of holes of the die. For example, when the blanking is made in three steps, as shown in a partial plan view of FIG. 13, areas No. 1 (opposite sides of areas in which two comb teeth 16 are to be formed) are first blanked, then area No. 2 (areas between the areas in which the two comb teeth are Go be formed) are blanked, and finally an area No. 3 18 (center hole) is blanked to form the comb teeth. (FIGS. 14A, 14B and 14C show the three steps for the entire frame plate.) By dividing the blanking into three steps, the interval $T_D$ of the holes 30a of the die can be widened and a problem of the strength of the die is solved.

Figure 15:
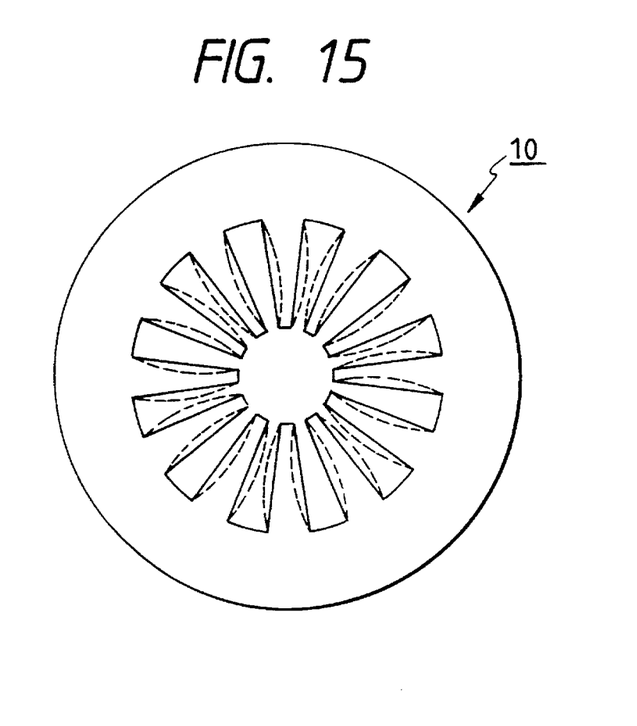
FIG. 15 shows a plan view for illustrating the circumferential deformation of comb teeth created in the prior art blanking process shown in FIGS. 11A to 11C.
Figure 16:
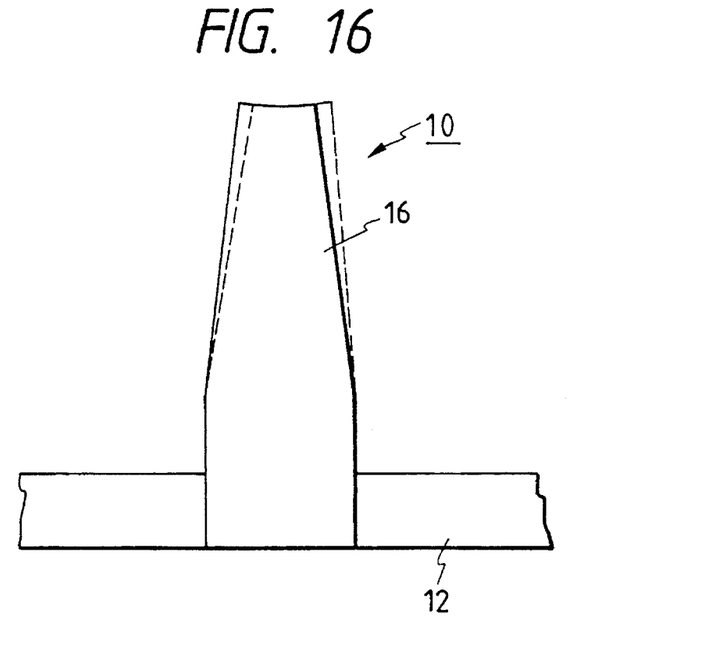
FIG. 16 shows a side view for illustrating the circumferential deformation of the comb teeth created by the prior art blanking process shown in FIGS. 11A to 11C.

However, as shown in FIG. 13, when the blanking is made in three steps, the comb teeth 16 are subjected to a force in the second step toward the areas blanked in the first step (direction X) so that they are blanked while they are deformed circumferentially as shown by a broken line. (FIG. 15 shows an entire frame plate). When such deformed comb teeth 16 are bent normally to the frame plate in the subsequent burring process, the comb teeth 16 are bent while they are circumferentially deformed as shown in FIG. 16. When a stepping motor is formed by using such a stator, the indexing of the step angle is not uniform and the positioning accuracy is lowered.

Figure 17:
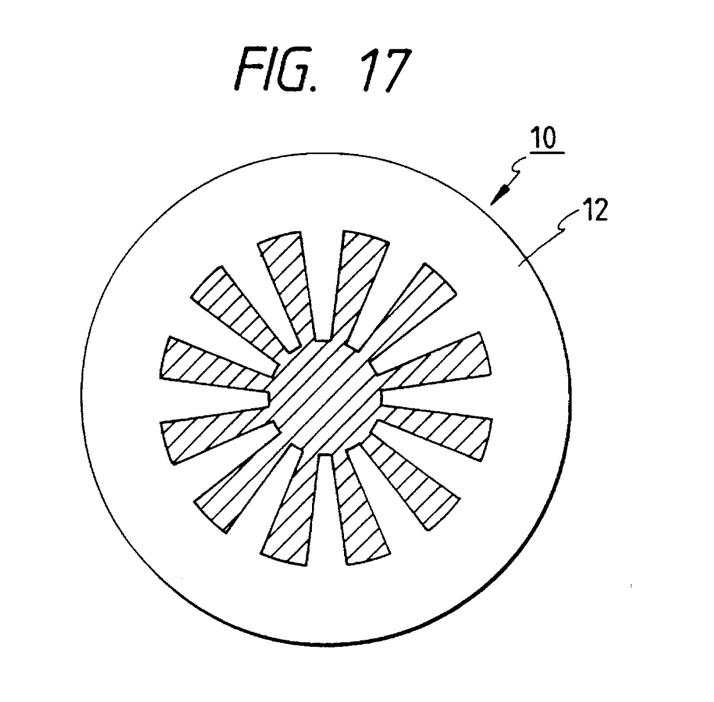
FIG. 17 shows a plan view for illustrating the blanking in the prior art process shown in FIGS. 11A to 11C.
Figure 18:
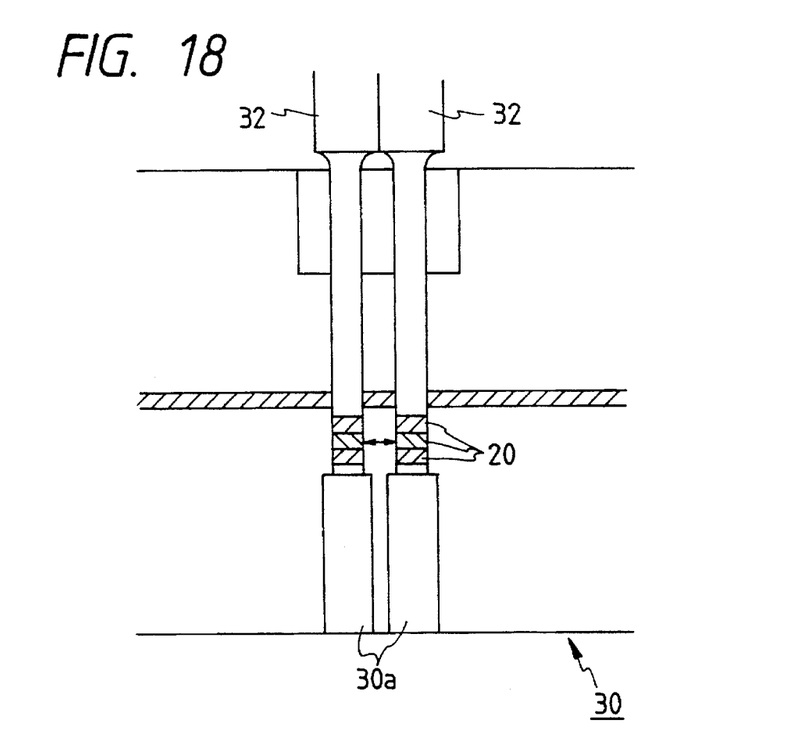
FIG. 18 shows a sectional view illustrating a member used in the blanking of the prior art process shown in FIGS. 11A to 11C and an operation thereof.

(2) As shown in FIG. 17, when the blanking process is conducted in one step, the problem encountered in the three-step blanking process (the deformation of the comb teeth) is solved but a new problem as described below is encountered. As shown in FIG. 18, the interval $T_D$ of the holes 30a of the die is narrow in a certain area (an area corresponding to ends of the comb teeth), and when the interval $T_D$ is narrower than a thickness t of the frame plate, the strength of the die is not sufficiently large and the die may be readily broken. Thus, mass production is not attained.

Figure 19:
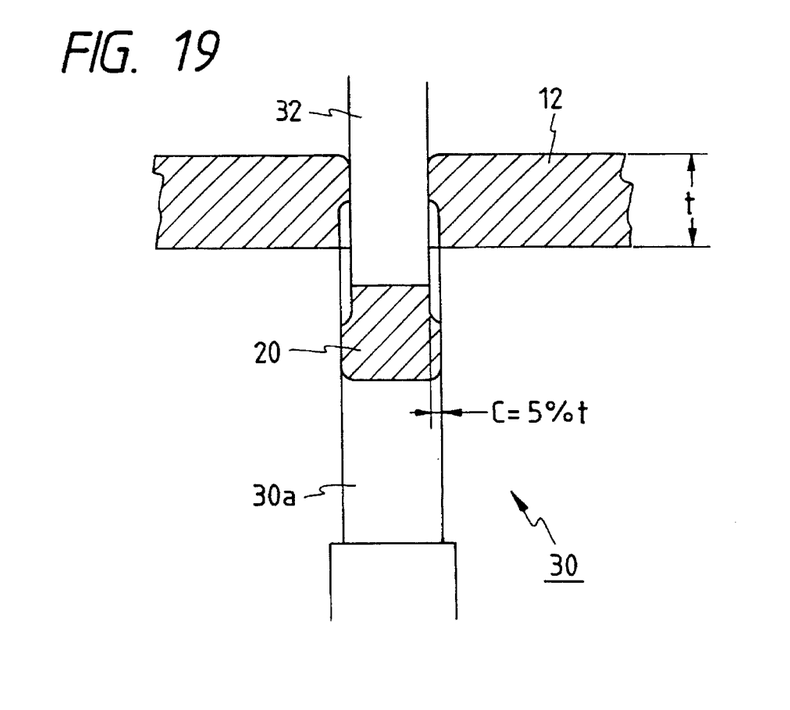
FIG. 19 shows a sectional view for illustrating a clearance used in the prior art process shown in FIGS. 11A to 11C.

As shown in FIG. 19, a blanking clearance (C) is usually set to approximately 0.05 t where t is a thickness of the frame plate. Accordingly, as shown in FIGS. 19 and 18, the blanked piece 20 is frictionally held by the hole 32a of the die and it is stacked. In the one-step blanking process, a holding pressure for the stacked blanked piece acts on the die side wall in the next blanking of the frame plate, and this causes the die to break.

Figure 20:
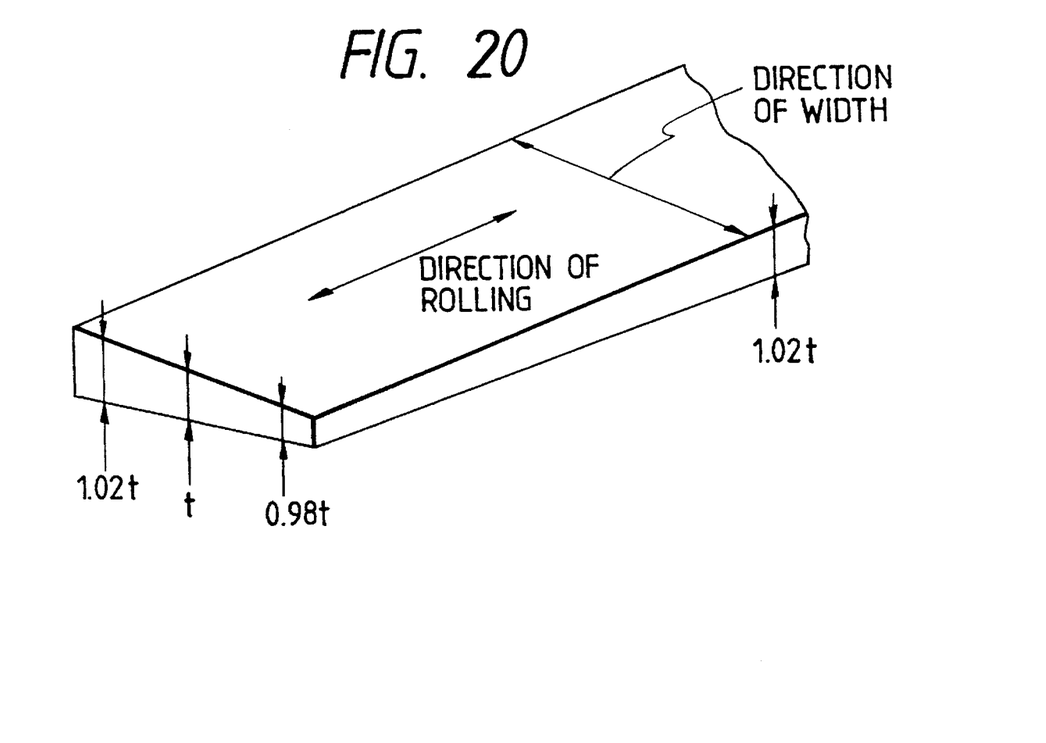
FIG. 20 shows a side view of a surface processed steel plate used as a frame plate.
Figure 21:
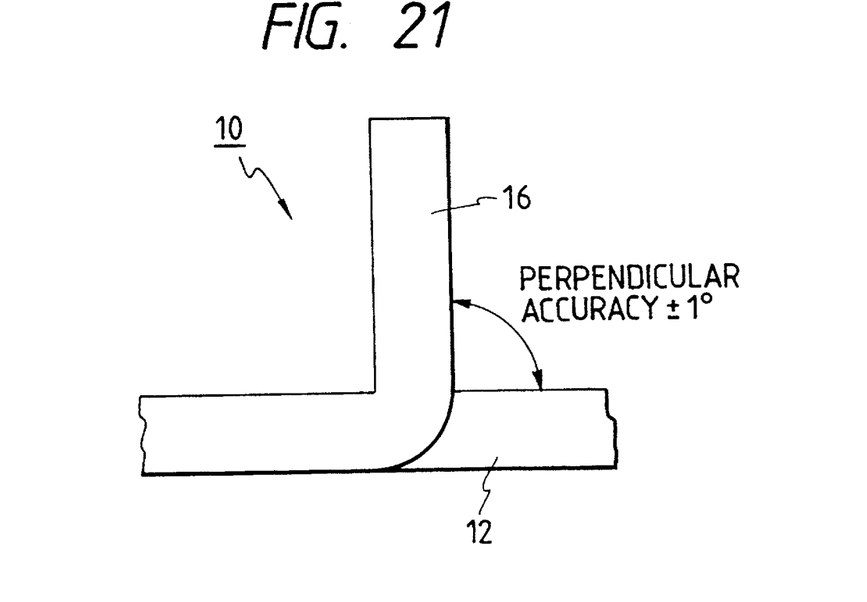
FIG. 21 shows a side view for illustrating a perpendicular accuracy in the prior art.

(3) A surface processed steel plate is used as a material for the frame plate. However, the surface processed steel plate includes a variation in the thickness by a rolling property. For example, there is usually a variation of approximately 4% between the thickness in the width direction and in the rolling direction (see FIG. 20). When the comb teeth formed by blanking the frame plate having the variation in the thickness are bent by the burring process, a right angle precision or perpendicular accuracy includes a variation of approximately ±1° as shown in FIG. 21 and a product precision of ±10° cannot be met. Thus, when the stepping motor is manufactured by using such a frame plate, the performance of the motor is deteriorated.

SUMMARY OF THE INVENTION

It is an object of the present invention to provide a method for manufacturing a stator of a stepping motor by using a new blanking process to solve the problems encountered in the prior art blanking process.

It is another object of the present invention to provide a method for manufacturing comb teeth of a stator of a stepping motor by using a step for making a thickness of a comb teeth area uniform prior to a burring process.

Other objects of the present invention will be apparent from the following description of the preferred embodiments of the present invention.

DETAILED DESCRIPTION OF THE PREFERRED EMBODIMENTS

An embodiment of the present invention is now explained with reference to the drawings. First, referring to FIGS. 1 and 2, an overall construction of a stepping motor is explained.

In FIGS. 1 and 2, numeral 1 denotes a rotor of a motor to which a rotary shaft is fixed. Numerals $3_1$, $3_2$ and $4_1$, $4_2$ denote stators on which comb teeth 3a and 3b, and 4a and 4b are arranged to oppose to each other. The comb teeth 3a and 3b, and 4a and 4b form alternate N and S magnetic poles along inner circumferences.

The stators $3_1$, $3_2$ and $4_1$, $4_2$ have bobbins 6a and 6b having exciting coils 5a and 5b wound thereon formed in hollow areas thereof. Numerals 7a and 7b denote flanges welded to the stators 3 and 4. Bearings 8a and 8b for supporting the rotary shaft 2 of the rotor 1 are arranged on the flanges 7a and 7b.

(First Embodiment)

A first embodiment of a method for manufacturing the stators $3_1$, $3_2$ and $4_1$, $4_2$ of the stepping motor described above is now explained.

Figure 3A:
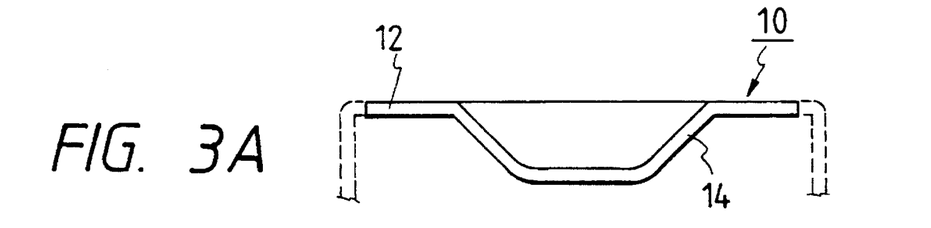
FIGS. 3A to 3E show manufacturing processes of a stator of a stepping motor in accordance with a first embodiment of the present invention.

FIGS. 3A to 3E illustrate a manufacturing process of the stators of the stepping motor. As shown in FIG. 3A, in a first step, a frame plate 10 having an outer cylinder formed thereon as shown by broken lines is projection-molded to project a center area 14. The projection mold step is required to make the length of the comb teeth larger than one half of the diameter of the blanking. Where it is not necessary to make the length of the comb teeth long, the first step is not necessary (see Embodiment 2 to be described later).

Figure 3B:
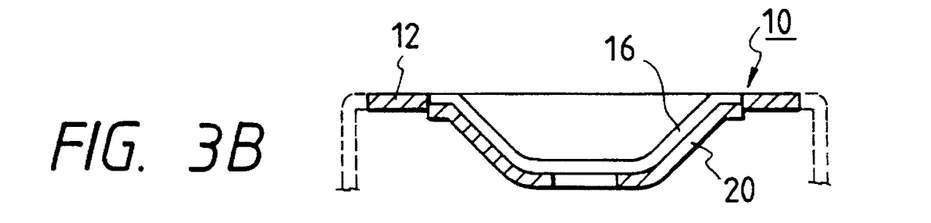

In a second step, as shown in FIG. 3B, a half-pierce and push-back process is carried out in order to make an area in which the comb teeth 16 are to be formed and an area which will become a blanked piece 20 to be readily separated. In the half-pierce and push-back process, which will be described later in detail with reference to FIGS. 5 to 7, the frame plate is punched to 80–90% of the thickness by a half-punch, and the blanked piece is pushed up from the bottom side by a push-back spring so that the blanked piece can be separated in a blanked piece drop step which is a third step to be described later. Since the half-pierce and push-back step may be carried out in one step, the deformation of the comb teeth which is encountered in the prior art process is avoided.

Figure 3C:
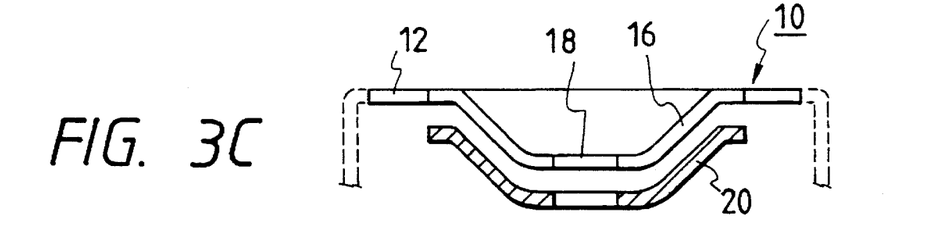

In the third step, as shown in FIG. 3C, the separable blanked piece 20 is dropped. It will be explained in detail with reference to FIG. 8. In the blanked piece drop step, a punch having a smaller diameter than the half-punch used in the half-pierce and push-back step and a die having a larger hole than a die used in the half-pierce and push-back step are used. Accordingly, the blanked piece drops without being stacked in the hole of the die as it happened in the prior art process and breaking of the die is avoided.

Figure 3D:
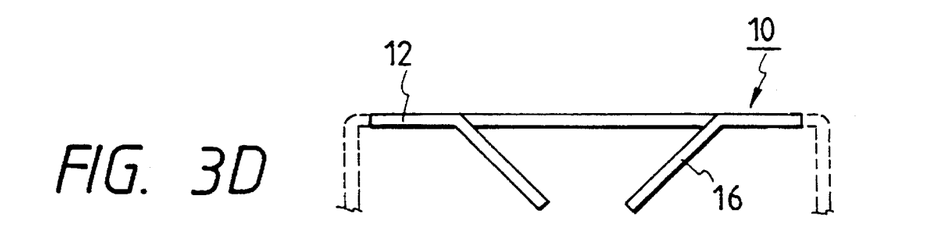

In a fourth step, as shown in FIG. 3D, a 45° bending and thickness collapse process in which the comb teeth are bent by approximately 45° and the plate thickness is collapsed by approximately 10% is carried out. Since this step is not essential to the present invention, it may be omitted but it will be explained later with reference to FIG. 9 because it is effective to improve the bending accuracy in a burring process to be described below.

When the comb teeth are to be collapsed, they are collapsed so that the thicknesses of the comb teeth are uniform. Since the thicknesses of the comb teeth are collapsed uniformly, a uniform force will be applied to the comb teeth when the comb teeth are bent at a right angle to an outer circumference of the frame plate in the next burring step so that a right angle bending precision or perpendicular accuracy is improved.

Figure 3E:
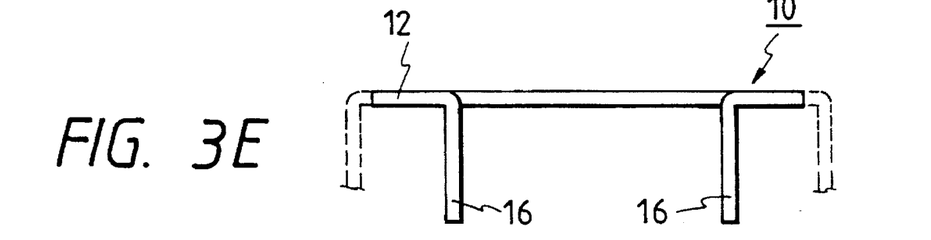

Finally, in a fifth step, as shown in FIG. 3E, the burring process is carried out to bend the comb teeth 16 at a right angle or perpendicularly to the outer periphery of the frame plate.

Figure 4:
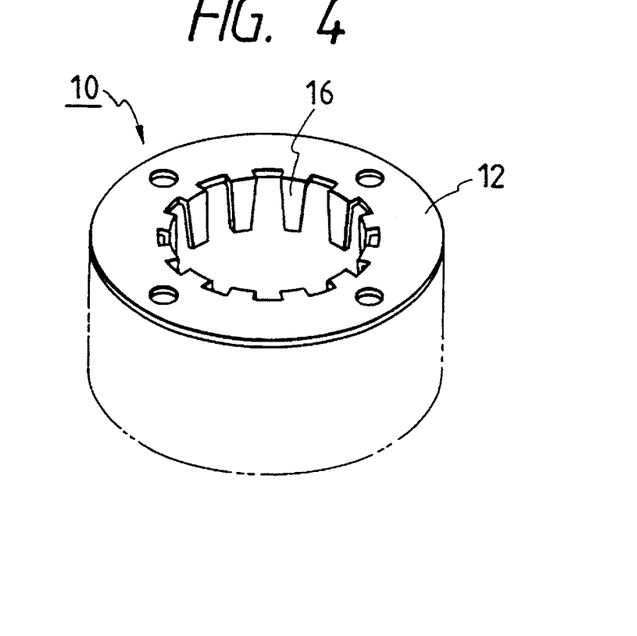
FIG. 4 shows a perspective view of the stator manufactured by the manufacturing process of FIGS. 3A to 3E.

FIG. 4 shows a perspective view of the stators of the stepping motor having the comb teeth formed thereon in the previous steps.

Figure 5:
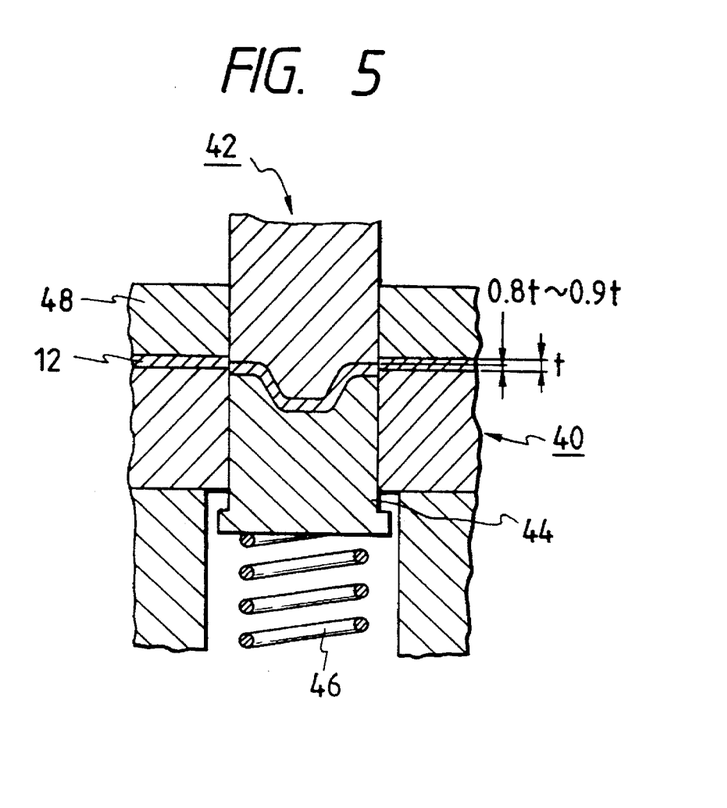
FIG. 5 shows a sectional view for illustrating a member used in a half piece and push-back process of FIGS. 3A to 3E and an operation thereof.
Figure 6:
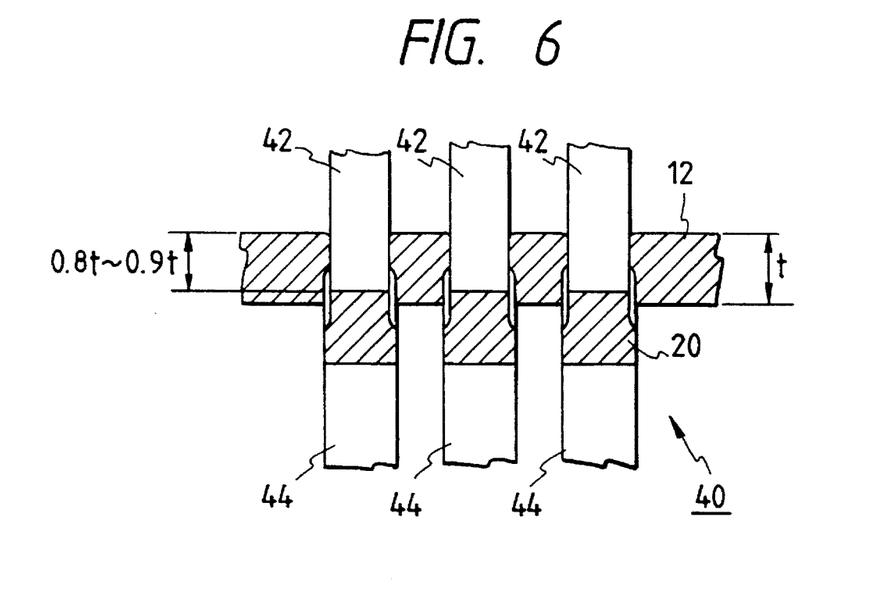
FIG. 6 shows a sectional view of a half pierce state of FIG. 5.
Figure 7:
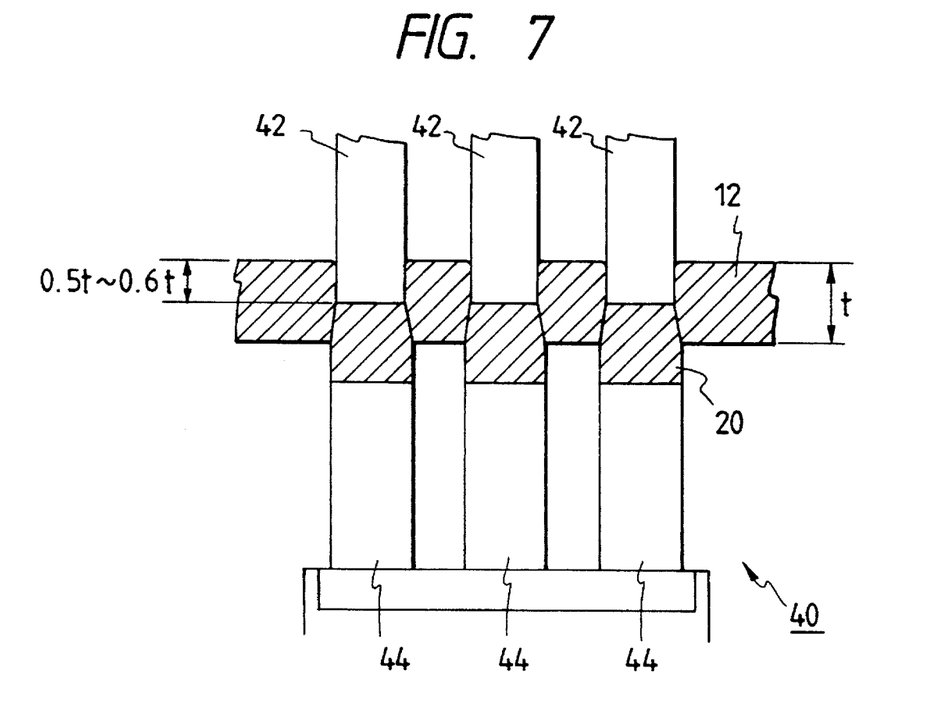
FIG. 7 shows a sectional view of a push-back state after the half pierce of FIG. 5.

Referring to FIGS. 5 to 7, the half-pierce and push-back process in the second step is explained. FIG. 5 shows a sectional view for illustrating members used in the half-pierce and push-back process and an operation thereof, FIG. 6 shows a sectional view illustrating a half-pierce state, and FIG. 7 shows a sectional view illustrating a push-back state after the half-piercing. As shown in FIG. 5, in this process, a die 40 for supporting the frame plate 10 and a half-punch 42 for punching the frame plate supported by the die 40 are used, and a knock-out 44 is arranged in the hole of the die 40. The knock-out 44 is normally biased upward by a push-back spring 46. Numeral 48 denotes a stripper. The frame plate 10 supported by the die 40 is punched to approximately 80–90% (0.8 t–0.9 t) of the thickness t by the half-punch 42 to form the comb teeth and make the blanked piece to be readily separated. Then, the punch process is stopped and the blanked piece is pushed back upward by the push-back spring 46 through the knock-out 44. As shown in FIG. 6, the punching is carried out to 80–90% of the plate thickness, and as shown in FIG. 7, the push-backing is thereafter carried out to push back to 50–60% (0.5 t–0.6 t) of the thickness. The half-pierce and push-back process is carried out in one step. By not completely punching and pushing back, the insufficiency of the die strength is not encountered and the prior art problem (the deformation of the comb teeth) is also prevented.

Figure 8:
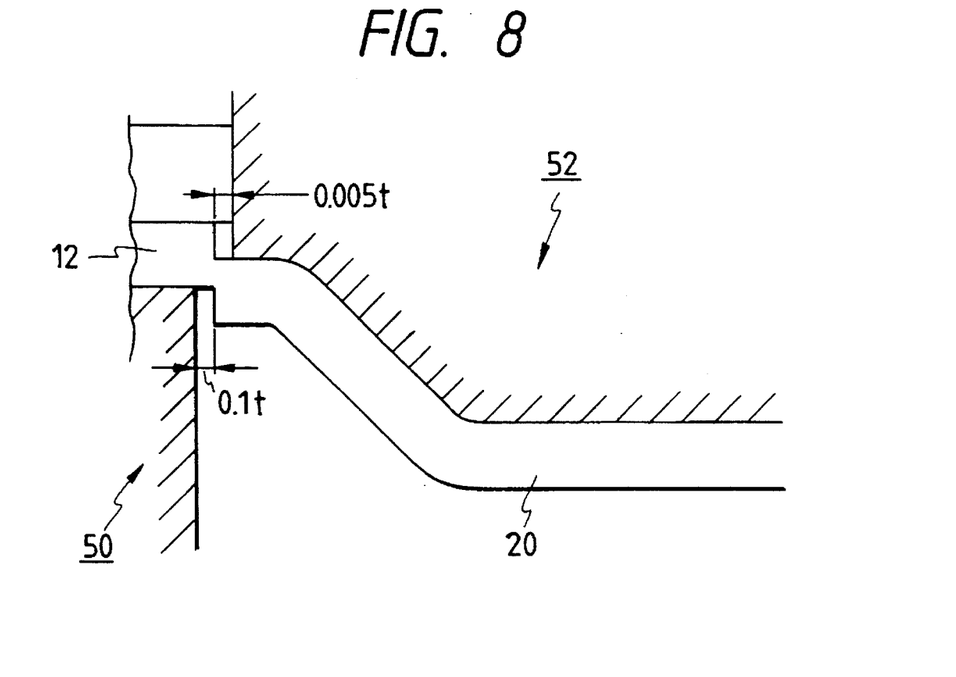
FIG. 8 shows a partial sectional view of a member used in a blanked piece drop process of FIG. 3 and an operation thereof.

Referring to FIG. 8, the blanked piece drop process of the third step is explained. FIG. 8 shows a partial sectional view for illustrating members used in the blanked piece drop process and an operation thereof. As shown in FIG. 8, in this process, a die 50 and a punch 52 are used to drop the blanked piece 20 which has been made readily separable in the previous half-pierce and push-back process. Since a relatively small punching force is sufficient in the blanked piece drop process, a die having a relatively large gap having a clearance of 0.1 t (t is the plate thickness) between the inner periphery of the hole of the die 50 and an end of the blanked piece 20 may be used and a punch having a relatively large gap having a clearance of 0.05 t between the punch 52 and the end of the blanked piece 20 may be used. Since the clearance between the inner periphery of the hole of the die 50 and the end of the blanked piece 20 is large, the entire blanked piece drops and the prior art problem (the pile-up of the blanked piece in the hole of the die and the resulting breaking of the die) is prevented.

Figure 9:
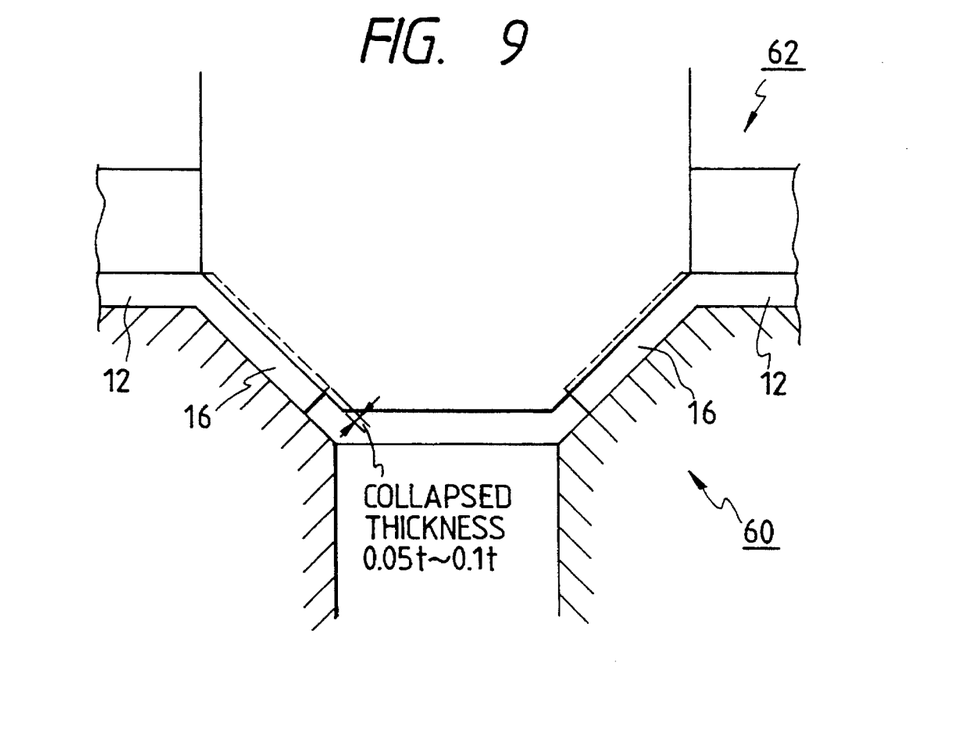
FIG. 9 shows a sectional view of a member used in a 45° bending and thickness flattening process and an operation thereof.

Referring to FIG. 9, the 45° bending and thickness collapse process of the fourth step is explained. FIG. 9 shows a sectional view illustrating members used in the 45° bending and thickness collapse process and an operation thereof. In this process, a die 60 having a 45° slope in section and a punch 62 having a 45° slope in section are used to bend the comb teeth 16 formed in the half-pierce and push-back process and the blanked piece drop process at a 45° angle and collapse the thicknesses of the comb teeth by approximately 5–10% (0.05 t–0.1 t) of the original thickness t to make the uniform thickness. (Simultaneously, the shape of the comb teeth is made linear.) Since the thicknesses of the comb teeth are uniform, a uniform force is applied to the comb teeth when the comb teeth are bent at a right angle to the outer periphery of the frame plate in the next burring process so that the right angle or perpendicularly bending accuracy is improved.

(Embodiment 2)

Referring to FIGS. 10A to 10D, a method for manufacturing the comb teeth of the stators of the stepping motor in accordance with an Embodiment 2 of the present invention is explained. FIGS. 10A to 10D illustrate the manufacturing process in the Embodiment 2. In the Embodiment 1, the projection molding is used to make the length of the comb teeth larger than one half of the diameter of the blanking. In this present Embodiment 2, the projection molding is not carried out because it is not necessary to make the length of the comb teeth long.

Figure 10A:
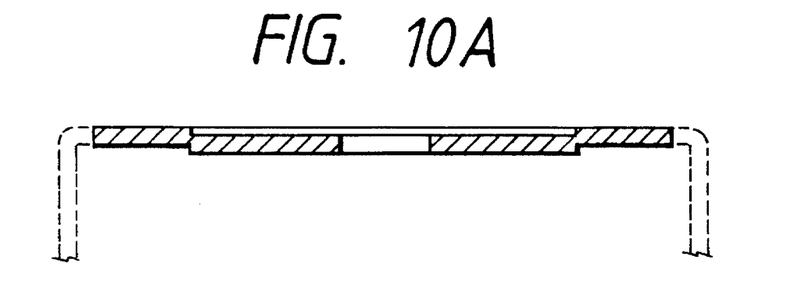
FIGS. 10A to 10D show manufacturing processes of a stator of a stepping motor in accordance with a second embodiment of the present invention.
Figure 10B:
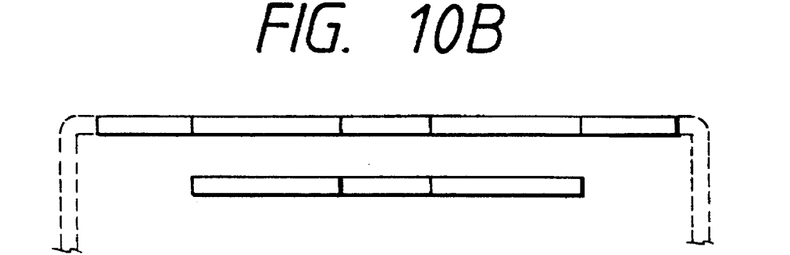
Figure 10C:
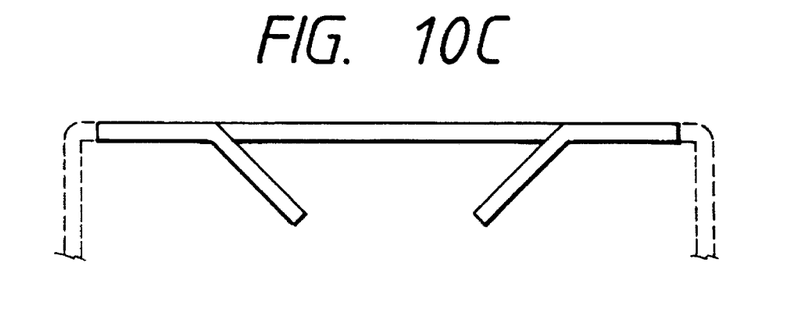
Figure 10D:
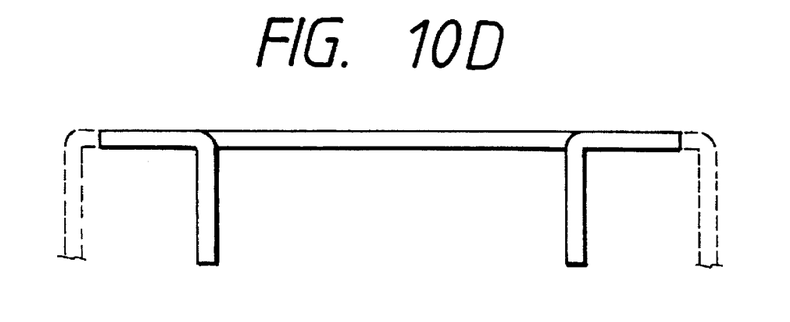

First, as shown in FIG. 10A, the half-pierce and push-back process is carried out, and as shown in FIG. 10B, the blanked piece drop process is carried out, and then, as shown in FIG. 10C, the 45° bending and thickness collapse process is carried out, and finally, as shown in FIG. 10D, the burring is carried out. Those steps correspond to the second to fifth steps and the detailed explanation thereof is omitted.

EXAMPLE

A result of an experiment conducted to prove the effects of the manufacturing method of the present invention over the prior art method is described below.

(1) A deformation angle along a circumference is ±30' in the prior art method while it is ±10' in the present invention method.

(2) The right angle or perpendicularly bending accuracy is ±1° in the prior art method while it is ±10' in the present invention method.

As described hereinabove, in accordance with the present invention, since the half-pierce and push-back process and the blanked piece drop process are used, the circumferential deformation of the comb teeth which is caused when the blanking is made in two or three steps is prevented, and breaking of the die which is caused in blanking in one step is prevented.

Further, since the 45° bending and thickness collapse process is used prior to the burring process, the thicknesses of the comb teeth are made uniform and the right angle precision or perpendicular accuracy in bending the comb teeth at a right angle in the burring process is improved.

What is claimed is:

1. A method for manufacturing a stator of a stepping motor comprising the steps of:
   carrying out a half-pierce and push-back process on a frame plate to make an area in which comb teeth are to be formed and an area to be blanked out readily separable;
   carrying out a blanking process to separate the blanked out area from the comb teeth; and
   bending the comb teeth at right angles to an outer periphery of the frame plate.

2. A method for manufacturing a stator of a stepping motor according to claim 1, wherein the half-pierce and push-back process includes punching 80–90% of the thickness of the frame plate with a half-punch and pushing back the blanked out area with a push-back spring.

3. A method for manufacturing a stator of a stepping motor according to claim 1, further comprising the step of carrying out a projection molding process to project a center area of the frame plate before the half-pierce and push-back process.

4. A method for manufacturing a stator of a stepping motor according to claim 3, wherein the projection molding process makes the length of the comb teeth larger than one half of a diameter of the blanking.

5. A method for manufacturing a stator of a stepping motor comprising the steps of:
   carrying out a half-pierce and push-back process to a frame plate to make an area in which comb teeth are to be formed and an area to be blanked out readily separable;
   carrying out a blanking process to separate the blanked out area from the comb teeth;
   bending the comb teeth to a predetermined angle and collapsing the comb teeth to make the thicknesses of the comb teeth uniform; and bending the comb teeth at right angles to an outer periphery of the frame plate.

6. A method for manufacturing a stator of a stepping motor according to claim 5, wherein the bending and collapsing step bends the comb teeth by approximately 45° and collapses the thickness of the frame plate by approximately 10%.

7. A method for manufacturing a stator of a stepping motor according to claim 5, further comprising the step of carrying out a projection molding process to project a center area of the frame plate before the half-pierce and push-back process.

* * * * *

UNITED STATES PATENT AND TRADEMARK OFFICE
CERTIFICATE OF CORRECTION

PATENT NO. :   5,526,560
DATED      :   June 18, 1996
INVENTOR(S) :  Tsuruya

It is certified that error appears in the above-indentified patent and that said Letters Patent is hereby corrected as shown below:

COLUMN 1:

Line 56, "Go" should read --to--.

COLUMN 3:

Line 2, "piece" should read --pierce--.

Signed and Sealed this

Third Day of December, 1996

Attest:

BRUCE LEHMAN

Attesting Officer          Commissioner of Patents and Trademarks